(12) United States Patent
Rosso et al.

(10) Patent No.: US 9,568,043 B2
(45) Date of Patent: Feb. 14, 2017

(54) LINKING DEVICE HAVING A BEARING AND WEAPONS SYSTEM COMPRISING SUCH A DEVICE

(71) Applicant: MBDA France, Le Plessis-Robinson (FR)

(72) Inventors: Antoine Rosso, Paris (FR); Hugo Rousseau, Clamart (FR); François Reisch, Les Claies-sous-Bois (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 14/768,743

(22) PCT Filed: Feb. 21, 2014

(86) PCT No.: PCT/FR2014/050359
§ 371 (c)(1),
(2) Date: Aug. 18, 2015

(87) PCT Pub. No.: WO2014/128415
PCT Pub. Date: Aug. 28, 2014

(65) Prior Publication Data
US 2015/0377284 A1 Dec. 31, 2015

(30) Foreign Application Priority Data
Feb. 22, 2013 (FR) ...................... 13 00414

(51) Int. Cl.
*F16C 33/34* (2006.01)
*F16C 23/06* (2006.01)
(Continued)

(52) U.S. Cl.
CPC .............. *F16C 23/06* (2013.01); *F16C 17/10* (2013.01); *F16C 17/12* (2013.01); *F16C 23/02* (2013.01);
(Continued)

(58) Field of Classification Search
CPC ..... F16C 41/001; F16C 2300/14; F16C 19/38; F16C 33/60; F16D 2121/22
See application file for complete search history.

(56) References Cited

U.S. PATENT DOCUMENTS 4,948,271 A * 8/1990 Nunotani .............. F16C 19/364
277/402
8,376,095 B2 * 2/2013 Nuissl ..................... F16C 19/30
188/171

(Continued)

FOREIGN PATENT DOCUMENTS

DE   10 2004 003 654 A1   8/2005
DE   10 2007 034 555 A1   1/2009
DE   10 2007 051 229 A1   4/2009

OTHER PUBLICATIONS

International Search Report mailed Jun. 23, 2014, issued in corresponding International Application No. PCT/FR2014/050359, filed Feb. 21, 2014, 6 pages.

*Primary Examiner* — Michael David
(74) *Attorney, Agent, or Firm* — Christensen O'Connor Johnson Kindness PLLC

(57) ABSTRACT

A linking device has a bearing and is suitable for use with a weapons system. The device provides adjustable rotational resisting torque of two coaxial cylindrical parts which are rotatable relative to one another about a shared axis. The bearing includes two rings made of a resiliently deformable material and is capable of respectively engaging with the two cylindrical portions, and between which rolling elements are arranged such as to be in contact with raceways of said rings. The device further includes a controllable member for adjusting the tightening of the rings, wherein the controllable member is capable of engaging one of said parts in order to engage with said bearing.

10 Claims, 2 Drawing Sheets

(51) Int. Cl.

| | |
|---|---|
| *F16C 41/00* | (2006.01) |
| *F16C 17/10* | (2006.01) |
| *F16C 17/12* | (2006.01) |
| *F16C 23/02* | (2006.01) |
| *F16C 33/62* | (2006.01) |
| *F16C 33/58* | (2006.01) |
| *F41A 23/12* | (2006.01) |
| *F16C 19/16* | (2006.01) |
| *F16C 33/32* | (2006.01) |

(52) U.S. Cl.
CPC ............... *F16C 33/58* (2013.01); *F16C 33/62* (2013.01); *F16C 41/001* (2013.01); *F41A 23/12* (2013.01); *F16C 19/163* (2013.01); *F16C 33/32* (2013.01); *F16C 2202/04* (2013.01); *F16C 2208/00* (2013.01); *F16C 2226/16* (2013.01)

(56) References Cited

U.S. PATENT DOCUMENTS

| | | | |
|---|---|---|---|
| 8,376,096 B2 | 2/2013 | Nuissl | |
| 8,479,893 B2* | 7/2013 | Nuissl | F16C 19/30 |
| | | | 188/171 |
| 2010/0150492 A1 | 6/2010 | Nuissl | |
| 2015/0377284 A1* | 12/2015 | Rosso | F16C 41/001 |
| | | | 89/37.01 |

* cited by examiner

LINKING DEVICE HAVING A BEARING AND WEAPONS SYSTEM COMPRISING SUCH A DEVICE

FIELD

The present disclosure relates generally to a connecting device having a bearing for adjusting the rotational resisting torque between two coaxial cylindrical parts which can rotate relative to one another about a common axis of rotation, and to a weapons system comprising the device.

Although the connecting device is described herein used specifically in a portable weapons system, in particular for adjusting the rotation of a firing station, together with the ammunition thereof, relative to a stationary support such as a tripod, it will be appreciated that the device could be mounted on any other type of system or mechanism that generally requires rotation and requires adjustment of the rotational resisting torque of two coaxial cylindrical parts relative to one another.

BACKGROUND

It is known that it should be made as simple as possible to orient the firing station (which in particular comprises the electronic devices and the aiming optics), together with the ammunition thereof, relative to the stationary tripod, which is placed on the ground, about a substantially vertical axis, in particular owing to the significant axial load of the rotational assembly composed of the firing station and the ammunition thereof. However, any operator or gunner of any body shape that may use the weapons system also has to sense the rotation of the assembly in order to allow him to direct the ammunition at the target in the most accurate way and to ensure optimum comfort when aiming.

For this purpose, a cylindrical part at the base of the firing station is inserted relatively into a coaxial, cylindrical receiving part of the tripod, which part is located at the center of the tripod, thus defining a rotational connection about the vertical axis. In order to ensure the rotation of the assembly relative to the tripod substantially about the vertical axis, a connecting device having a bearing of the rolling bearing type is provided between the two parts, which device takes over the axial load and allows the firing station to rotate relative to the stationary tripod in order to orient the station.

The solutions for the connecting devices currently in use involve either generating friction in the connection (what is known as solid friction) or joining thereto an external viscous damper which is in communication with the bearing (what is known as fluid friction).

However, despite their widespread use, these connecting devices have drawbacks.

Indeed, during use, the solid friction solution generates heat and jolts when the weapon system is being used, and this affects the quality of both the guidance and the aim. Moreover, since the systems are used outside at extremely variable temperatures and humidity levels and by gunners who may have different body shapes, these drawbacks quickly become apparent and are exacerbated.

For its part, despite the quality of the connection, the fluid friction solution is disadvantageous owing to the high cost (bearing and viscous damper), the bulk and the greater weight thereof, which always has a negative impact during transport of the weapons system. In addition, regular maintenance is essential.

SUMMARY

One object of the present disclosure is to overcome the aforementioned drawbacks of the connecting devices having a bearing, among others. In this regard, disclosed embodiments of the connecting device having a bearing for adjusting the resisting torque between two coaxial cylindrical parts which can rotate relative to one another about a common axis of rotation are distinguished according to the device in that said bearing comprises two rings, which are made of an elastically deformable material, are capable of cooperating respectively with the two cylindrical parts, and between which rolling elements are arranged so as to be in contact with rolling tracks of said rings, said device comprising a controllable adjustment member for clamping the rings, which member is capable of cooperating with one of said parts in order to act upon said bearing.

Owing to the disclosure, it is thus possible to adapt the clamping force of the connection between the two parts by deforming the rings, the elastically deformable material of which makes them flexible to a certain extent. In this way, the operator can use the controllable member to adjust the connecting device between the two parts as desired and in accordance with various other parameters, in particular temperature and humidity, by means of the deformation of the rings.

These rings made of elastically deformable material thus ensure that the pivot connection between the two parts, i.e. the tripod and the firing station containing ammunition, about the axis of rotation is braked and damped, without causing jolts as in the prior art devices that use solid friction, and without resorting to complex, expensive devices that use viscous damping.

Lastly, a rolling resistance is created by the rolling elements being in contact with the rings, the resistance being stronger or weaker depending on the specific adjustment made by the operator on the basis of what he senses, and being controlled by the operator so that the rotatable part rotates easily or in a restrained manner with respect to the stationary part. A compromise is thus found between the prior art solutions.

The device according to the a first representative embodiment thus resembles a ball-bearing, without actually being one, whereby advantage is taken of the rolling resistance of such a bearing in order to create the damping which is controlled by the adjustment member.

For example, the rings may be made completely of an elastically deformable material, the tracks being an integral part of the rings.

In one representative embodiment, the rolling tracks are connected to the rings of the bearing and are made of an elastically deformable material.

Advantageously, the elastically deformable material in some embodiments preferably has a hardness of between 60 and 100 Shore A. A value of 80 Shore A is preferred and allows for a good compromise between sufficient flexibility in the bearing to allow the operator enough sensation, and sufficient strength for good durability.

In another representative embodiment, the elastically deformable material is a synthetic or natural polymer such as Courbhane.

In a representative arrangement, the rings bear respectively on the surfaces opposite one of the cylindrical parts and the clamping adjustment member, which is attached by screws to the other cylindrical part.

The rings of the bearing may be, for example, tapered so as to ensure that the cylindrical parts are centered in an optimum manner.

In various representative embodiments, the rolling elements are balls, rollers or cones, and are held by a frame, and are made of a polymer material, metal, glass or the like.

The disclosure also relates to a portable weapons system comprising a support and a firing station which contains its ammunition and is mounted so as to be rotatable relative to the support by means of coaxial cylindrical parts which are respectively connected to the support and the firing station, the parts being able to rotate relative to one another by means of a connecting device having a bearing.

Advantageously, embodiments of the connecting device are defined above.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
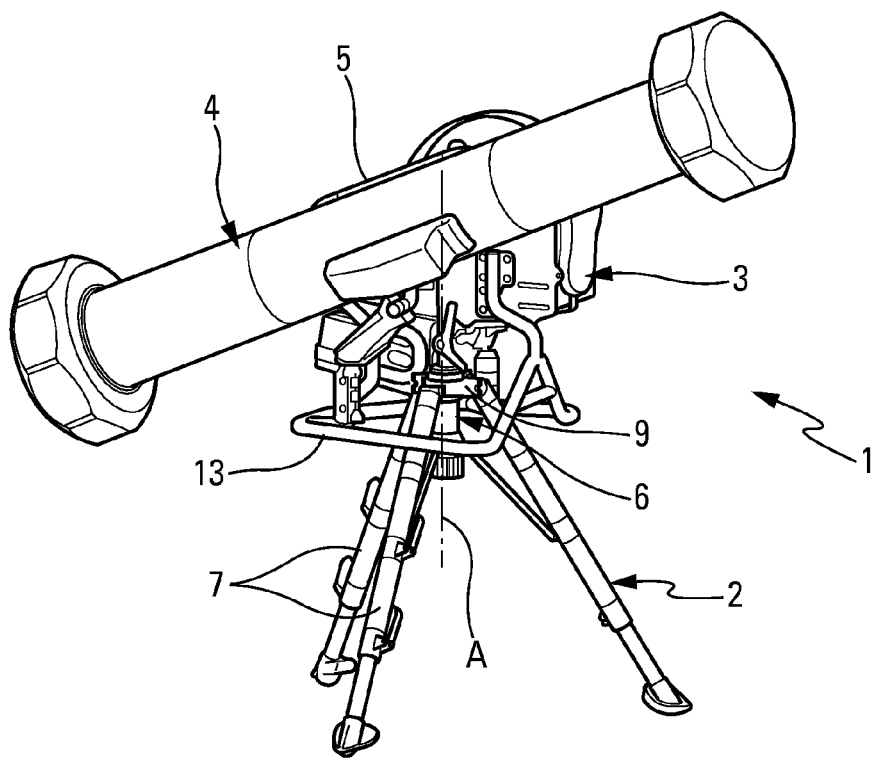
FIG. 1 is a perspective view of a representative embodiment of a weapons system comprising a tripod support and a firing station which is rotatably mounted on the support, in particular by means of a connecting device according to the embodiment having a bearing.

The weapons system shown in FIG. 1 is an antitank system 1 comprising a support in the form of a tripod 2, a firing station 3 having the electronic and optical devices necessary for preparing and aiming the shot, and a piece of ammunition 4, such as a missile, mounted in a tube 5 connected to the structure of the firing station. Once unfolded and placed on the ground, the tripod 2 is assumed to be stationary, such that the assembly, composed in particular of the firing station 3 and the ammunition 4, can be rotated by a handle 13, which is rigidly connected to the firing station structure, about a vertical axis A relative to the tripod 2 in order to direct the missile at the target.

Figure 2:
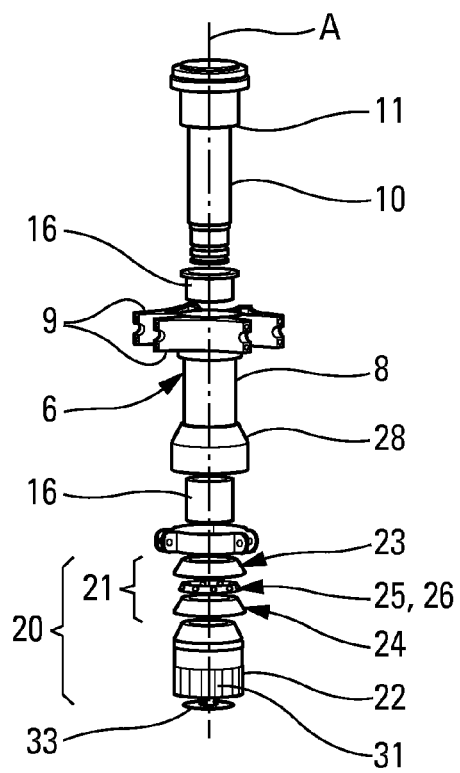
FIG. 2 is a perspective, exploded view of the arrangement, prior to assembly, of the respective cylindrical parts of both the tripod and the connecting device which is provided between the parts.

For this purpose, as shown in FIGS. 1 and 2, the tripod 2 comprises a central mount 6 linking the upper ends of the three feet 7, which are also adjustable, of the tripod (the lower ends rest on the ground). The frame 6 is in the form of a cylindrical part 8 which has an annular cross section, defines the axis A and is provided on the outside with three radial tabs 9 for attaching the feet. A cylindrical part 10, similar to a hollow shaft, of the firing station structure is received in the cylindrical part 8 so as to be freely rotatable, such that the "firing station 3-ammunition 4" assembly can rotate about the axis A relative to the stationary tripod by means of the rotational connection between the cylindrical shaft 10 and the annular hollow receiving sleeve 8.

The assembly axially abuts the tripod by means of an outer shoulder 11 (FIGS. 2 and 3) which is provided at the upper end 12 of the shaft and cooperates with a complementary shoulder 14 provided on the sleeve, at the upper end 15 thereof, from which the tabs 9 extend radially. Rings 16 are arranged between the firing station shaft 10 and the tripod sleeve 8, and ensure that the two cylindrical parts are rotationally guided in a precise manner.

Figure 3:
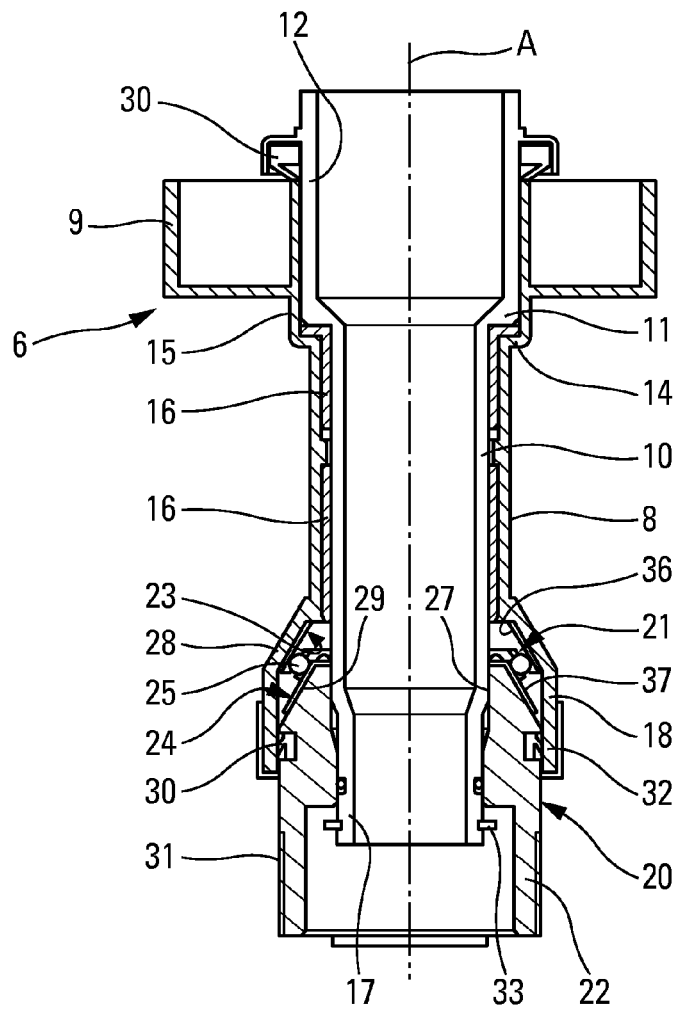
FIG. 3 is an axial cross section of the arrangement, following assembly, of the parts and the connecting device.

To adjust the resisting torque between the two tubular cylindrical parts 8 and 10, a connecting device 20 having a bearing 21 is provided between the shaft 10 and the sleeve 8, more particularly at the respective ends 17, 18 thereof as shown in particular in FIGS. 2 and 3. The lower end 18 of the sleeve is widened such that the device comprising the bearing 21 and a controllable adjustment member 22 for clamping the bearing 21 are arranged between the lower end of the sleeve and the lower end 17 of the shaft.

Figure 4:
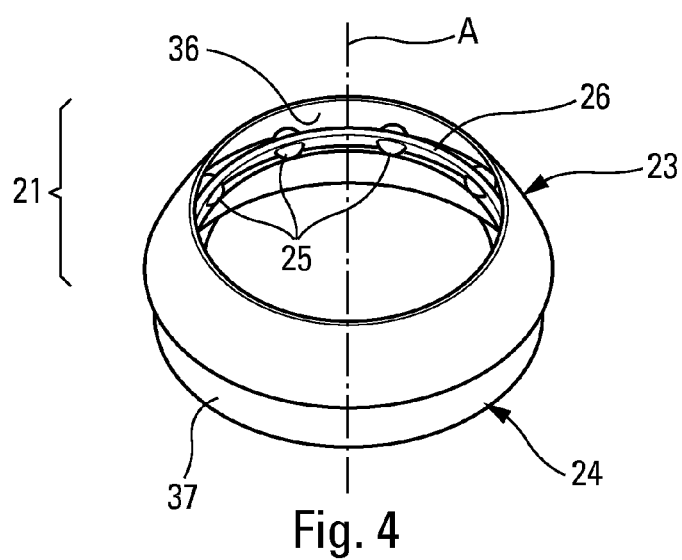
FIG. 4 is a perspective view of an embodiment of the deformable bearing of the connecting device.

As shown in FIGS. 2, 3 and 4, the bearing 21 comprises two identical coaxial rings 23, 24 (upper and lower ring, respectively, with regard to the figures), between which rolling elements 25 are arranged, which are interconnected by a frame 26. The elements 25 are in contact with respective rolling tracks 36, 37 provided on the rings.

Advantageously, the rings 23, 24 of the bearing are made of an elastically deformable material which is flexible to a certain extent in order to brake the rotation of the "firing station 3-ammunition 4" assembly to a greater or lesser extent depending on the desire of the gunner and the environmental conditions, and has a particular hardness for preventing the tracks from becoming marked during use and the resultant jolts, and for guaranteeing the durability and reliability of the device 20.

For example, the rings 23, 24, together with the rolling tracks 36, 37 thereof, form a single unit and are produced integrally from an elastically deformable material, the hardness of which is in a range of between 60 and 100 Shore A, preferably from 80 to 90 Shore A. In particular, a material such as a polymer of the Courbhane type or similar is suitable for meeting the above requirements. In a variant, the rolling tracks, which are thus made of an elastically deformable material, could be connected to and attached to metal rings, for example.

The rolling elements 25, such as balls in the illustration shown, can be made of polymer (elastomer, Nylon, etc.) or of metal or glass or any other suitable material. They are intended for transmitting the resisting torque from the member 22, by means of the track 37 of the lower ring 24, to the track 36 of the upper ring 23 connected to the rotatable assembly of the weapons system 1.

The member 22 for adjusting the resisting torque has an annular, cylindrical shape, which is mounted around the shaft 10 close to the lower end 17 by means of a screw connection 27 and is inserted between the shaft and the widened lower end 18 of the sleeve. The adjustment member 22, which is similar to a nut, can also be accessed from the outside of the sleeve (because member projects beyond the sleeve) and has an outer periphery 31 which is knurled or similar in order to allow the operator to grip and maneuver the member.

In addition, it can be seen in FIGS. 2-4 that the rings 23, 24 of the bearing are tapered and bear, in the case of the upper ring 23, on a transition shoulder or surface 28, having the same taper, of the sleeve 8 which has its widened lower end 18. The lower ring 24 bears on a chamfer or surface 29, having the same taper, of the adjustment member 22, which is mounted on the shaft 10 by means of the screw connection 27. Good centering of the rings and gradual, controlled clamping thereof is thus ensured when the member 22 is adjusted.

Seals 30 are also provided between the upper end 12 of the shaft 10, which emerges above the tripod, and the tripod, and between the outer periphery 31 of the member 22, which is inserted into the lower, knurled end 18 of the sleeve, and the wall 32 of the end. These seals prevent dust or the like entering inside the connection between the parts 8 and 10 and the device 20. An axial stop 33 in the form of a ring is provided on top of the lower end 17 of the shaft 10 for preventing the adjustment member 22 from unexpectedly coming out.

As shown in FIG. 3, the screwing of the adjustment member 22 allows the bearing 21 of the device 20 to be adjusted, and thus allows for rotation, which is free or pronounced to a greater or lesser extent, about the axis A of the firing station and of the ammunition 4 thereof relative to the tripod 2. The material of the rings 23, 24 having rolling tracks 36, 37 allows damping to be created between the rings owing to the rolling resistance of the balls, which are further clamped between the tracks of the flexible, deformable rings. In this way, the rotatable assembly of the weapons system 1 is braked by the adjustment member 22, which bears on the elastically deformable rings by means of the balls, being tightened to a greater or lesser extent, as desired by the gunner.

As a result, the device 20 allows forces to be generated which resist the clamping torque, depending on the tightening of the adjustment member and the deformable material on the rings, the forces involving resistance to the rotation (rolling of the balls on the tracks made of more flexible or less flexible material) which creates damping that is advantageously controlled by the adjustment member. The device 20 takes advantage of the rolling resistance of the balls in order to generate the damping in the connection.

According to different variants, the rings of the bearing could be flat or stepped instead of being tapered, or could have an opposite taper, without departing from the disclosure. It would also be possible to increase the number thereof (three rings forming two successive bearings, or two independent bearings in a row), to develop the material of the balls or tracks, and to replace the balls with rollers or cones.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A weapons system comprising a firing station having a first cylindrical part, a base having a second cylindrical part coaxial with the first cylindrical part, and a connecting device rotatably coupling the firing station to the base, the connecting device comprising a bearing configured to provide adjustment of a resisting torque between the first and second cylindrical parts, which can rotate relative to one another about a common axis of rotation, wherein said bearing comprises two rings made of an elastically deformable material and configured to cooperate respectively with the first and second cylindrical parts, and between which rolling elements are arranged so as to be in contact with rolling tracks of said rings, said device further comprising a controllable adjustment member for clamping the rings to selectively deform the elastically deformable rings, selective deformation of the elastically deformable rings providing selective adjustment of the resting torque, the adjustment member being configured to cooperate with one of the first and second cylindrical parts in order to act upon said bearing.

2. The weapons system according to claim 1, wherein the rings are made completely from an elastically deformable material, the tracks being an integral part of the rings.

3. The weapons system according to claim 1, wherein the rolling tracks are connected to the rings of the bearing and are made of an elastically deformable material.

4. The weapons system according to claim 1, wherein the elastically deformable material has a hardness of between 60 and 100 Shore A.

5. The weapons system according to claim 1, wherein the elastically deformable material is a synthetic or natural polymer such as Courbhane.

6. The weapons system according to claim 1, wherein said rings bear respectively on the surfaces opposite one of the first and second cylindrical parts and the clamping adjustment member, which is attached by screws to the other of the first and second cylindrical parts.

7. The weapons system according to claim 1, wherein the rings of the bearing are tapered.

8. The weapons system according to claim 1, wherein the rolling elements are balls, rollers or cones.

9. The weapons system according to claim 1, wherein the rolling elements are held between the rings by a frame and are made of plastics material, metal or glass.

10. A portable weapons system comprising a support and a firing station which has the ammunition thereof and is rotatably mounted on said support by coaxial cylindrical parts which are connected to the support and the firing station, respectively, and can rotate relative to one another by a connecting device having a bearing, wherein said bearing comprises two rings which are made of an elastically deformable material, are capable of cooperating respectively with the two cylindrical parts, and between which rolling elements are arranged so as to be in contact with rolling tracks of said rings, said device comprising a controllable adjustment member for clamping the rings to selectively deform the elastically deformable rings, selective deformation of the elastically deformable rings providing selective adjustment of a force that resists rotation of the cylindrical parts relative to each other, the adjustment member being configured to cooperate with one of said cylindrical parts in order to act upon said bearing.

* * * * *